United States Patent
Niemelä et al.

(10) Patent No.: US 8,499,077 B2
(45) Date of Patent: Jul. 30, 2013

(54) CONTROLLING INTERNET ACCESS USING DNS ROOT SERVER REPUTATION

(75) Inventors: Jarno Niemelä, Espoo (FI); Jarkko Konola, Oulu (FI)

(73) Assignee: F-Secure Corporation, Helsinki (FI)

(*) Notice: Subject to any disclaimer, the term of this patent is extended or adjusted under 35 U.S.C. 154(b) by 0 days.

(21) Appl. No.: 13/367,539

(22) Filed: Feb. 7, 2012

(65) Prior Publication Data
US 2012/0203904 A1 Aug. 9, 2012

(30) Foreign Application Priority Data
Feb. 7, 2011 (GB) .................................... 1102003.9

(51) Int. Cl.
*G06F 15/173* (2006.01)
*G06F 17/30* (2006.01)

(52) U.S. Cl.
USPC ............................................. 709/225; 726/2

(58) Field of Classification Search
USPC ................... 709/223–226; 726/1–4, 22–27
See application file for complete search history.

(56) References Cited

U.S. PATENT DOCUMENTS

| 7,111,253 | B2* | 9/2006 | Newman .......................... 715/854 |
| 7,117,253 | B2* | 10/2006 | Nakayama et al. ............ 709/218 |
| 7,818,343 | B1* | 10/2010 | Sekhar et al. .................. 707/781 |
| 2006/0288076 | A1 | 12/2006 | Cowings et al. ............... 709/206 |
| 2008/0059634 | A1 | 3/2008 | Commons ....................... 709/225 |
| 2008/0060054 | A1* | 3/2008 | Srivastava ......................... 726/2 |
| 2008/0222243 | A1 | 9/2008 | Shaw ............................ 709/203 |
| 2010/0174795 | A1* | 7/2010 | Adelman et al. .............. 709/206 |
| 2011/0185428 | A1* | 7/2011 | Sallam ............................ 726/24 |
| 2012/0096261 | A1* | 4/2012 | Ko et al. ......................... 713/168 |
| 2012/0198549 | A1* | 8/2012 | Antonakakis et al. .......... 726/22 |

FOREIGN PATENT DOCUMENTS

| WO | WO 02/03167 A2 | 1/2002 |
| WO | WO 2007/136665 A2 | 11/2007 |
| WO | WO 2010/123623 A2 | 10/2010 |

* cited by examiner

*Primary Examiner* — Chirag R Patel
(74) *Attorney, Agent, or Firm* — Harrington & Smith

(57) ABSTRACT

A method of controlling internet access on a client computer. The method includes identifying a DNS request generated on the client computer and which is addressed to a specific DNS root server, and sending an information request to a central server identifying said DNS root server. Then, at the central server, reputation information for said DNS root server is determined, and said reputation information is provided from the central server to the client computer. The reputation information is then used at the client computer to handle the DNS request or a response to that request.

19 Claims, 5 Drawing Sheets

CONTROLLING INTERNET ACCESS USING DNS ROOT SERVER REPUTATION

TECHNICAL FIELD

The present invention relates to the controlling of internet access on client computers. In particular the present invention relates the controlling of internet access on a client computer by using DNS root server reputation information.

BACKGROUND

The Internet uses the Domain Name System (DNS) to associate the names of computers with their numeric internet protocol addresses (IP addresses). The top level of the domain name hierarchy, known as the root-level DNS, contains the highest level domains that appear as the suffixes of all Internet domain names, for example ".com", ".net" and ".uk". The official root-level DNS is administered by the Internet Corporation for Assigned Names and Numbers (ICANN). ICANN is responsible for managing these top level domains ("TLDs"). ICANN cooperates with national registries that are responsible for allocating and administering country level domain names. There are also a number of other organisations that operate unofficial DNS root servers, which administer alternative custom (i.e. non-ICANN sanctioned) top-level domains, e.g. ".wj" or ".dh". A DNS root is an entity that has one or more servers that administer the same domain information. Therefore, when the term "DNS root server" is used throughout the present application, it is to be understood that this can mean a single server, a cluster of servers behind one IP address, or a cluster of servers in which each server has its own IP address.

Having an official DNS run by ICANN and the national authorities enables the easy removal, or "take down", of web sites that may be engaged in illegal activity, such as hosting malicious software ("malware") or illegal material. For example, computer viruses or other malware will often, once installed on a computer, download additional components from some web page in order to perform a malicious activity, and domain take downs provide one of the chief weapons against such activity. By taking down the domain on which the components are hosted, the malware cannot obtain the components that it requires to function.

Unfortunately, domains that are administered by alternative DNS root servers cannot be taken down as easily as domains administered by official ICANN DNS root servers. This has lead to TLDs administered by alternative DNS root servers being used to host illegal and non-mainstream material. Unfortunately, as a consequence of high profile domain takedowns, there is a significant move to create more alternative DNS root servers.

FIG. 1 shows an example of a typical process that is carried out when a website is accessed from a client computer using a domain name. In this example, the website being accessed is example.com. The client computer makes a connection to the DNS server at the client computer's internet service provider (ISP), and asks for the IP address for the domain name. The ISP DNS Server then connects with the root-level DNS servers and requests the IP address of the top level domain (TLD) name server that handles .com queries. The root servers return the requested IP address back to the ISP DNS Server, which then makes a connection with the TLD name server and requests where it can find information regarding example.com. The TLD name server will then respond with the IP address of a host name server. The host name server will be maintained by the webhost for the domain name and will hold the details that map the domain name with an IP address. The ISP DNS server makes a connection to the host name server and requests where it can find example.com. The host name server will respond with the IP address for example.com and the ISP DNS server will relay this IP address back to the client computer.

Caching can reduce the workload of the name servers. For example, when the IP address for a domain name has been provided to the ISP DNS server, it can store that IP address in a temporary cache. Then when another request to access the same domain name arrives at the ISP DNS server, that server can return the IP address to the client computer immediately without having to communicate with the name servers again. In addition to caching at the ISP DNS server, client computers themselves can also contain a temporary cache of recently viewed websites, meaning that the client computer does not even have to send the repeat request to the ISP DNS server. All information stored in these temporary caches, both at the ISP and on the client computer, will however have originated from the name servers.

The client computer is not restricted to only sending DNS requests to the ISP DNS server. It can alternatively be configured to use any other DNS server, for example the DynDNS.org DNS server or Google Public DNS server.

DNS hijacking is the practice of redirecting DNS requests to other DNS root servers. If a computer is infected by malware, the malware may change the DNS root server assignment without the user's consent such that all DNS requests are sent to an alternative DNS root server. The alternative DNS root server may simply be used to resolve DNS requests to domains that are hosted at an alternative TLD which would not be resolved by an official DNS root server. Additionally, the alternative DNS root server may act as a "rogue" DNS root server, and when the user tries to visit legitimate websites, they are instead redirected to a "bogus" website. This type of attack is termed "pharming". If the bogus site that the user is redirected to is a malicious website that masquerades as the legitimate website in order to fraudulently obtain sensitive information, it is termed phishing.

SUMMARY

It is an object of the present invention to provide a method of controlling internet access on client computers. This can be achieved by using reputation information for the DNS root server to which the DNS request is addressed, and blocking the DNS request or a response to that request when the reputation information does not meet the requirements of parental and/or content control settings.

According to a first aspect of the invention there is provided a method of controlling internet access on a client computer. The method comprises identifying a DNS request generated on the client computer and which is addressed to a specific DNS root server and then sending an information request to a central server identifying said DNS root server. At the central server, reputation information for said DNS root server is determined, and said reputation information is provided from the central server to the client computer. The reputation information is then used at the client computer to handle the DNS request or a response to that request.

Embodiments of the present invention may provide an improved method of preventing a client computer from accessing certain domains that are typically used to host unsuitable or malicious content. Embodiments of the current invention may also provide a method of preventing a client computer from accessing all domains with TLDs that are administered by alternate DNS root servers.

The method may comprise parsing the identified DNS request in order to capture the identity of the DNS root server to which the DNS request is addressed.

The information request may comprise the IP address of the DNS root server to which the DNS request is addressed, or it may comprise the URL of the DNS root server to which the DNS request is addressed.

Mappings between DNS root servers and respective DNS root server reputations may be maintained at the central server, and the step of determining reputation information at the central server can comprise identifying the mapping corresponding to said specific DNS root server, and using the associated DNS root server reputation to generate said reputation information.

The information request may include the TLD of the domain requested in the DNS request, and the central server may maintain mappings between TLDs administered by the DNS root server and respective TLD reputations. The step of determining reputation information at the central server may comprise combining said associated DNS root server reputation with the associated TLD reputation mapped for said TLD of the requested domain.

The reputation information can comprise a rating assigned to the DNS root server, and the rating can reflect the type of material that is typically hosted using TLDs administered by the DNS root server.

The reputation information may indicate whether the DNS root server is an official ICANN DNS root server or an alternative DNS root server.

The reputation information may comprise a rating assigned to the TLD of the domain requested in the DNS request.

The step of using the reputation information at the client computer to handle the DNS request or a response to that request may comprise comparing the reputation information with the parent and/or content control settings on the client computer.

In the case that the reputation information indicates that the DNS root server should not be trusted, the step of handling the DNS request or a response to that request may comprise one of: blocking the DNS request from being sent from the client computer; and preventing the client computer from accessing the domain for which the DNS request was sent.

In the case that the reputation information indicates that the DNS root server can be trusted, the step of handling the DNS request or a response to that request may comprise allowing the DNS request to be sent from the client computer and on receipt of the DNS request response, accessing the requested domain.

If no reputation information can be found at the central server, the reputation information provided to the client computer may cause the DNS request to be blocked from being sent, or the DNS request response is blocked from being received at the client computer.

According to a second aspect of the invention, there is provided a client computer comprising a DNS resolver for generating and sending DNS requests, and receiving DNS request responses, a DNS root authoriser for identifying the DNS root server to which DNS requests generated by the DNS resolver are addressed, sending information requests to a central server, said information requests including the identity of the DNS root server, receiving reputation information from said central server; and a parental and/or content control handler for comparison of the received reputation information with the parental and/or content control settings on the client computer, and for subsequently handling the DNS requests or responses to those requests.

The client computer may be a personal computer, a mobile device, or any other internet-connected device.

According to a third aspect of the invention there is provided a central server or server cluster, for serving a multiplicity of client computers. The central server or server cluster comprises a database of DNS root server reputations. Each DNS root server reputation entry comprises information on the type of material typically hosted on TLDs administered by each DNS root server. The central server or server cluster also comprises a database searcher, for finding the DNS root server reputations that correspond with DNS root server identified in information requests being received from one or more client computers, and a transmitter for sending reputation information back to the respective client computers, said reputation information comprising the DNS root server reputations for the DNS root servers identified in the received information requests.

The server may further comprise a database of TLD reputations, each TLD reputation entry comprising information on known TLDS administered by a given DNS root server, and the reputation information sent back to the client computers may comprise a combination of DNS root server reputation and TLD reputation.

DETAILED DESCRIPTION

As discussed above, the use of alternative DNS root servers can cause problems due to the inability to take down domains that are administered by said alternative DNS root servers. Because of this, websites that are administered by alternative DNS root servers are regularly used when hosting malicious and/or illegal content. Generally speaking, material that is hosted at such a domain can be seen as being suspicious by its very nature, and is highly likely to be unsuitable for children to view, or for employees to be viewing on "work computers" during working hours for example.

Figure 1:
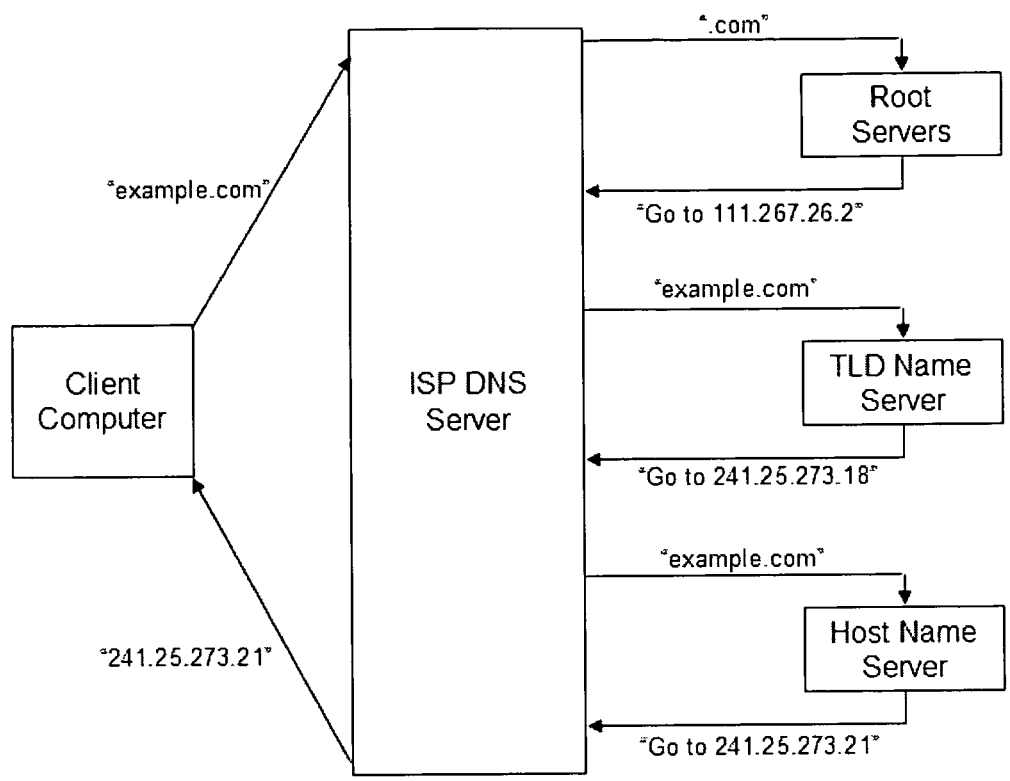
FIG. 1 illustrates the process of resolving a DNS request sent from a client computer to an ISP DNS server.
Figure 2:
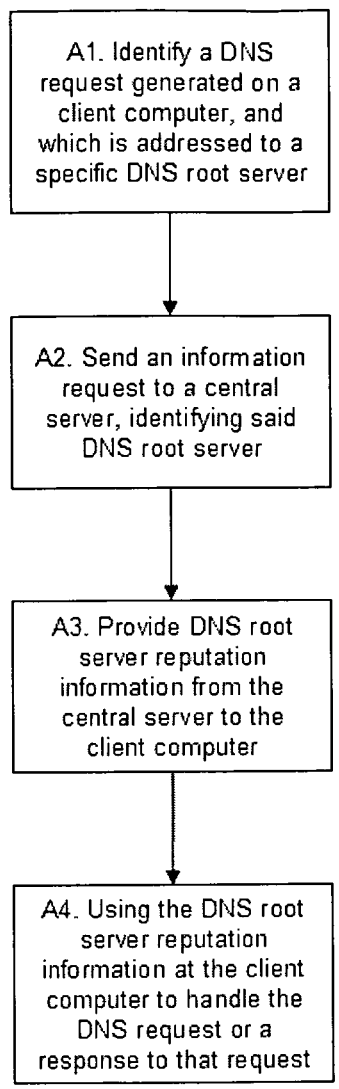
FIG. 2 is a flow diagram illustrating a method of providing a client computer with the reputation information of the DNS root server in order to control internet access.

A method will now be described that can be used to control internet access on a client computer such that access to some domains, for example those that are not administered by official ICANN DNS root servers, can effectively be restricted. This method involves using information on the reputation of a DNS root server in order to determine whether or not to allow access to a domain administered by that DNS root server. FIG. 2 is a flow diagram that illustrates a method of controlling internet access on the client computer. The steps of the method are:

A1. Identifying a DNS request generated on a client computer, and which is addressed to a specific DNS root server.

A2. Sending an information request to a central server, identifying said DNS root server.

A3. Providing DNS root server reputation information from the central server to the client computer.

A4. Using the DNS root server reputation information at the client computer to handle the DNS request or a response to that request.

Figure 3:
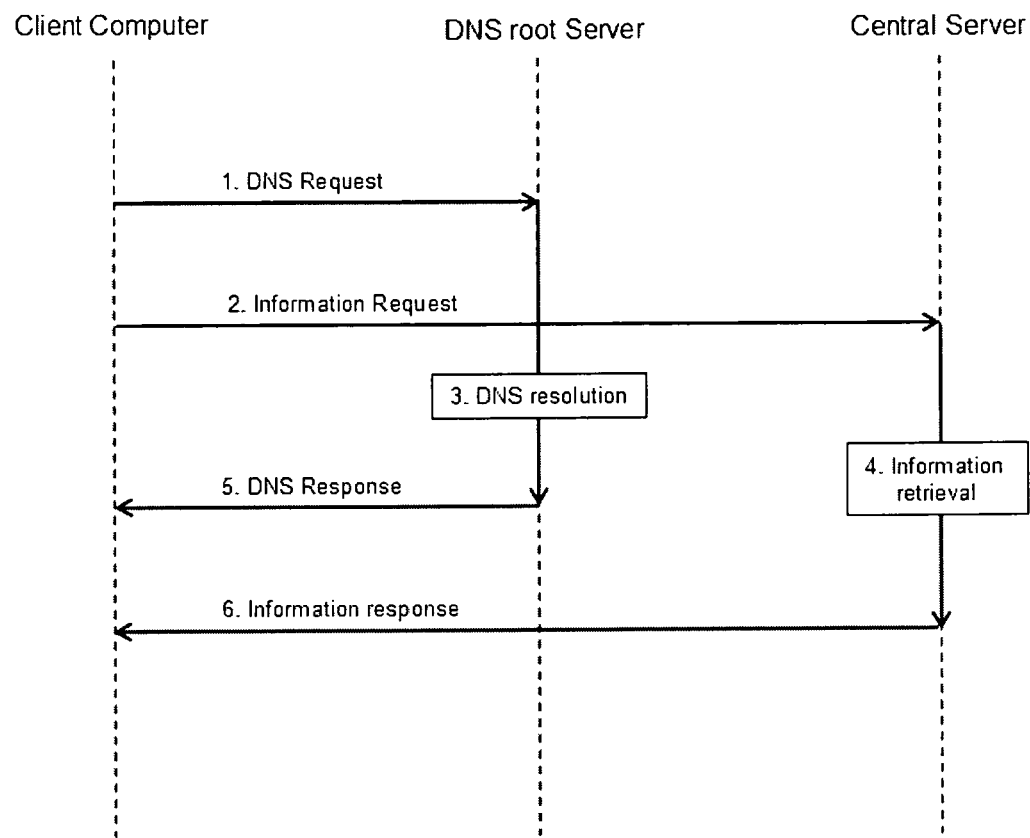
FIG. 3 illustrates schematically the requests sent out and the responses received by the client computer.

As shown in the representation in FIG. 3, the client computer may send out two requests. Step 1 represents the DNS request sent from the DNS resolver at the client computer to a specific DNS root server. Step 2 represents the information request that the client computer sends to the central server. The information request identifies the DNS root server. The entire domain name (or URL) that is to be resolved may also be sent to the central server. The parsing of the DNS request to capture the identity of the DNS root server to which the DNS request is sent can be carried out either at the client computer or the central server. FIG. 3 shows the DNS request being sent before the Information request, but the requests may be sent out in a different order, simultaneously, or indeed the DNS request may not be sent out at all. Step 3 represents the resolution of the DNS request at the DNS root server, and step 4 represents the reputation information being retrieved at the central server. The DNS response (step 5) and the Information response (step 6) are returned to the client computer from the DNS root Server and the Central Server respectively. Again, the order in which the responses are received at the client computer may vary, and a DNS request response may not be received at all if the DNS request was not sent.

Figure 4:
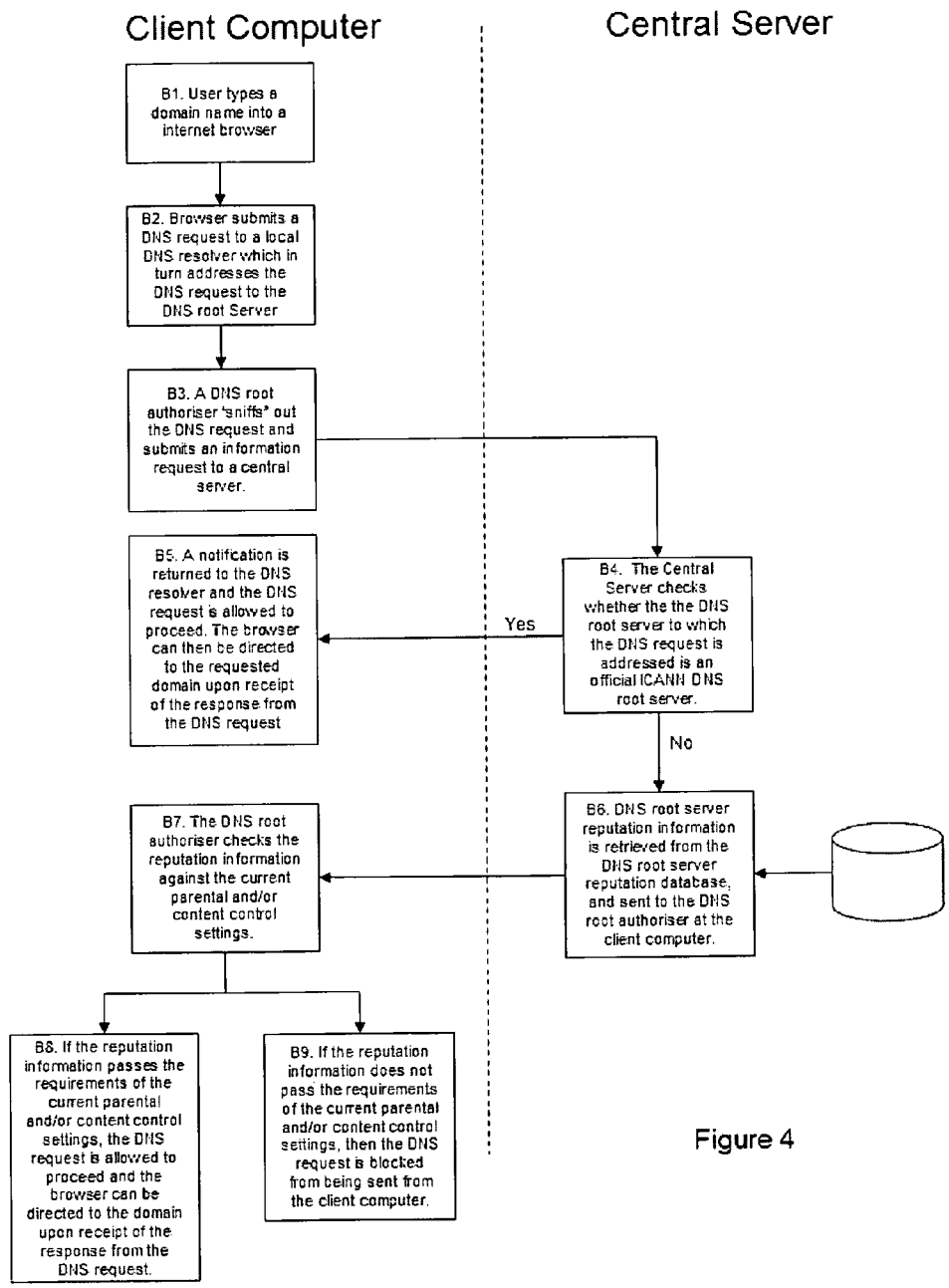
FIG. 4 is a flow diagram illustrating the method of FIG. 2 according to a considered example.
Figure 5:
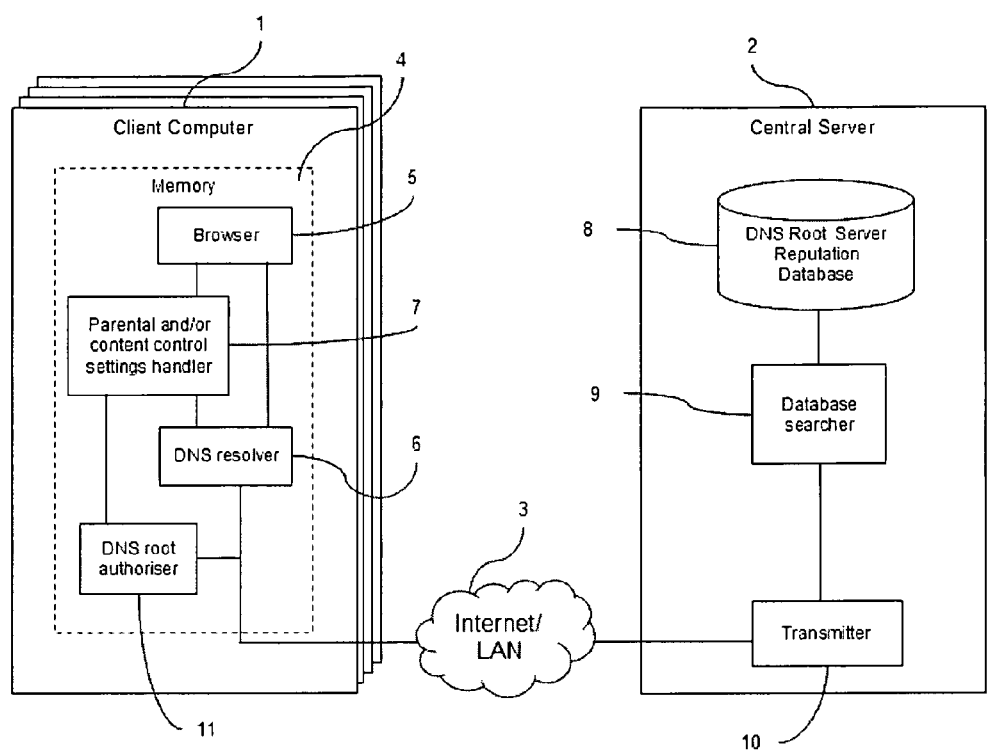
FIG. 5 illustrates schematically the computer system used in the method of FIG. 4.

The method can be further illustrated by considering an example. In this example the DNS root server reputation information is stored on a database at the central server, which is a web server or web server cluster run by the provider of the internet access control service, e.g. in conjunction with a conventional antivirus service. The DNS root server reputation information comprises a rating for each alternative DNS root server. The rating is based on the type of material that is typically hosted on domains with TLDs that are administered by alternative DNS root servers. For instance, an alternative DNS root server that is used to administer a ".virus" TLD which is known to host malware files might be assigned a very low rating, whereas an alternative DNS root server that is used to administer a ".sport" TLD that is known to host material on sports might be given a relatively high rating. It is beyond the scope of this disclosure to consider in detail how ratings are allocated, although one way to carry this out might be to collect and analyse material using a web spider and/or to use feedback provided (manually and or automatically) to the central server by client computers. FIG. 4 is a flow diagram illustrating the steps as carried out in the example, with reference being made to FIG. 5 which shows a schematic representation of the computer system used in the method. More particularly, FIG. 4 depicts the following steps:

B1. A user on a client computer 1 indicates that he/she wishes to navigate to a website by typing a domain name into the Internet browser 5.

B2. The browser software 5 submits a DNS request to a local DNS resolver 6, which in turn addresses the DNS request to the DNS root server.

B3. A DNS root authoriser 11, which is implemented by a security application installed on the client computer, "sniffs out" the DNS request and submits an information request to a central server 2 via the internet or a LAN 3. The DNS root authoriser is pre-configured with an IP address and port number of the central server.

B4. The central server 2 checks whether the DNS root server to which the DNS request is addressed is an official ICANN DNS root server, or if it is an alternative DNS root server.

B5. If the DNS request is addressed to an official ICANN DNS root server, a notification is returned to the DNS root authoriser 11 and the DNS request is allowed to proceed and the browser 5 can be directed to the requested domain upon receipt of the response from the DNS request including the IP address matching the domain name.

B6. If the DNS request is addressed to an alternative DNS root server, the central server 2 retrieves the DNS root server reputation information, including the rating, from a DNS root server reputation database 8, and then sends the DNS root server reputation information and rating back to the DNS root authoriser 11 at the client computer 1.

B7. The DNS root authoriser 11 then checks the reputation information against the current parental and/or content control settings 7.

B8. If the reputation information passes the requirements of the current parental and/or content control settings 7, the DNS request is allowed to proceed and the browser 5 can be directed to the domain upon receipt of the response from the DNS request including the IP address matching the domain name.

B9. If the reputation information does not pass the requirements of the current parental and/or content control settings 7, then the DNS request is blocked from being sent from the client computer.

In step B1, the user of the client computer 2 indicates that he/she wishes to navigate to a specific web page by typing a domain name into the internet browser 5. Alternatively, the user may have clicked a link or have been directed to the browser from another application, for example after clicking on a link in an email. In step B2, the browser 5 submits a DNS request to the local DNS resolver 6 which in turn submits the DNS request to the DNS root server. The local DNS resolver 6 is typically part of the operating system of the client computer, and is stored in the memory 4 of the computer. The DNS request is sent so that the browser 5 is able to navigate to the IP address where the domain can be found. The DNS resolver 6 may have a local cache in which it stores the DNS addresses of recently viewed domains. If this is the case, then the local cache can also store the DNS root server reputation information for the list of recently viewed domains. This would allow the local DNS resolver to provide the DNS root server reputation information at the client computer without having to repeat steps B3-B7 if a DNS request had already been recently processed for the domain.

In step B3 a DNS root authoriser 11, which is implemented by a security application installed at the client computer 1, "sniffs out" the DNS request and then submits an information request to a central server 2 via the Internet or a LAN 3. The central server 2 is run and maintained by the internet access control service provider and comprises a DNS root server reputation database 8, as explained above. The database will have been previously populated with reputation information and ratings for all known alternative DNS root servers, and will be updated regularly by the internet access control service provider to include any changes to existing entries in the database and to include any new alternative DNS root servers.

In B4, the central server 2 checks to see if the DNS root server to which the DNS request is addressed is an official ICANN DNS root server. A large majority of Internet traffic will be carried out using DNS requests addressed to official ICANN DNS root servers, and so this quick check allows the central server to provide a fast response back to the client computer 1. If the DNS request is addressed to an official ICANN DNS root then, as shown in step B5, the central server 2 sends a notification back to the DNS root authoriser 11 and the browser 5 is allowed to proceed to the requested domain upon receipt of the response from the DNS request, including the IP address matching the domain name. If the DNS Request is not addressed to an official ICANN DNS root server, in step B6 the central server 2 searches the alternative DNS root server reputation database 8 using the database searcher 9 and retrieves the entry that corresponds to the alternative DNS root server in question. This information, which includes the rating assigned to the alternative DNS root server by the internet access control service provider, is then sent to the DNS root authoriser 11 at the client computer.

In step B7, the DNS root authoriser 11 then uses the reputation information and the assigned rating and checks it against the current parental and/or content control settings 7. If the reputation information passes the requirements of the parental and/or content control settings 7, then the DNS request is allowed to proceed and the browser 5 can be directed to the domain upon receipt of the response from the DNS request, including an IP address matching the domain name, as stated in step B8. If, however, the reputation information does not pass the requirements of the parental and/or content control settings 7, then the DNS request is blocked from being sent from the client computer (Step B9).

The parental and/or content control settings can be set on the client computer by an administrator who may, for example, be a parent of a child to whom the client computer belongs. The parental/content control level can be set by choosing a rating level that can be compared with the domain rating set by the content control service provider. In this example, if an alternative DNS root server has been assigned a rating by the content control service provider that is below the level set in the client computer parental and/or content control settings, then the client computer will block the outgoing DNS request from being sent. If an information request is sent regarding a DNS request that is addressed to a DNS root server that does not have a corresponding entry in the DNS root server reputation database, then the central server will send a notification back to say that the DNS root server is not recognised. Depending on how the parental and/or content controls are set, the client computer may block the DNS request from being sent out to a DNS root server that is not recognised by the central server.

Instead of allowing all official ICANN DNS root server traffic as described in the above example, the database at the central server may also contain top level domain ("TLD") reputation information for TLDs administered by official ICANN DNS roots as well. This will enable the blocking of domains which are hosted on some of the more disreputable TLDs that are administered by official DNS roots. For example, some countries may provide a country code top level domain (ccTLD) that is often used to host questionable content, or "official" TLDs may be specifically provided to host adult content, e.g. ".xxx". Providing a rating for official TLDs such as these will provide the same Internet access control over TLDs administered by official DNS root servers as for those administered by alternative DNS root servers.

Some alternative DNS root servers may be used to administer a number of TLDs that host a wide variety of content. This makes it hard to give any useful reputation information on the DNS root server as a whole. For example one specific alternative DNS root server may administer both a ".sport" TLD that is generally used to hosting websites that contain information on sport, and also a ".virus" TLD that is used to host malware files. Such alternative DNS root servers can be considered to be "questionable DNS root servers". In order to be able to deal with questionable DNS root servers in a pragmatic way, the central server can provide a "second layer" of information that relates to the TLD of the domain requested. For example, a client computer sends an information request to the central server. The information request includes the Uniform Resource Locator (URL) that is the object of the DNS request. The central server finds the entry for the DNS root server to which the DNS request is addressed in its DNS root reputation database which states that it is a "questionable DNS root server". The central server now uses the TLD of the URL and searches in a separate database, which contains a black list and a white list for all known TLDs that are administered by that DNS root server. If the TLD is on the black list, then the central server can respond to the information request with reputation information advising the client computer to block the DNS request, whereas if the TLD is on the white list, the reputation information can advise the client computer to allow the DNS request to be sent and the client computer to access to the domain. As an alternative to the black and white lists, and in a similar way to the DNS root server reputation information, each individual TLD may instead be assigned a rating.

In order to access some domains with TLDs that are administered by alternative DNS root servers, a client computer may not use the standard local DNS resolver that comes as part of the operating system. Instead, resolvers can make use of add-on peer-to-peer (P2P) technology. Use of a P2P DNS system may be implemented by a piece of malware, for example, without the knowledge of the client computer's user. Instead of submitting a DNS request to the DNS root server, the client computer will instead use an additional protocol to query for DNS resolution, requesting the required information from a network of P2P nodes instead of a centralised server. In this model the peer nodes within the P2P network are all suppliers and consumers of the resources, in contrast to the traditional model in which the DNS server supplies the information for the client computers to consume. If a P2P DNS system was being used at a client computer, a DNS request is sent using an add-on component instead of the standard local DNS resolver (which is part of the Operating System). If the use of such an add-on component is detected, it can be deduced that the requested domain is likely to be administered by an alternative DNS root, and access to the domain should be blocked. Use of such an add-on can be detected by looking for activity such as a DNS response being received without any DNS requests being sent to a network or local cache.

The examples presented above describe internet access through an internet browser (i.e. using http), but it will be understood that the method can be implemented with any Internet access from a client computer. For example, the domain requested may be hosting a file that is to be downloaded using File Transfer Protocol (FTP).

It will be appreciated by the person of skill in the art that various modifications may be made to the above described embodiments without departing from the scope of the present invention.

The invention claimed is:

1. A method of controlling internet access on a client computer, the method comprising:
    identifying a DNS request generated on the client computer and which is addressed to a specific DNS root server;
    sending an information request to a central server identifying said DNS root server;
    at the central server determining reputation information for said DNS root server;
    providing said reputation information from the central server to the client computer; and using the reputation information at the client computer to handle the DNS request or a response to that request.

2. A method as claimed in claim 1, comprising parsing the identified DNS request in order to capture the identity of the DNS root server to which the DNS request is addressed.

3. A method as claimed in claim 1, wherein the information request comprises the IP address of the DNS root server to which the DNS request is addressed.

4. A method as claimed in claim 1, wherein the information request comprises the URL of the DNS root server to which the DNS request is addressed.

5. A method as claimed in claim 1, comprising maintaining at the central server mappings between DNS root servers and respective DNS root server reputations.

6. A method as claimed in claim 5, wherein the step of determining reputation information at the central server comprises identifying the mapping corresponding to said DNS root server, and using the associated DNS root server reputation to generate said reputation information.

7. A method as claimed in claim 6, wherein the information request includes the TLD of the domain requested in the DNS request, and wherein the central server maintains mappings between TLDs administered by the DNS root server and respective TLD reputations, and the step of determining reputation information at the central server comprises combining said associated DNS root server reputation with the associated TLD reputation mapped for said TLD of the requested domain.

8. A method as claimed in claim 1, wherein the reputation information comprises a rating assigned to the DNS root server.

9. A method as claimed in claim 8, wherein the rating reflects the type of material that is typically hosted using TLDs administered by the DNS root server.

10. A method as claimed in claim 1, wherein the reputation information indicates whether the DNS root server is an official ICANN DNS root server or an alternative DNS root server.

11. A method as claimed in claim 1, wherein the reputation information comprises a rating assigned to the TLD of the domain requested in the DNS request.

12. A method as claimed in claim 1, wherein the step of using the reputation information at the client computer to handle the DNS request or a response to that request comprises comparing the reputation information with parent and/or content control settings on the client computer.

13. A method as claimed in claim 1, wherein, in the case that the reputation information indicates that the DNS root server should not be trusted, the step of handling the DNS request or a response to that request comprises one of blocking the DNS request from being sent from the client computer; and preventing the client computer from accessing the domain for which the DNS request was sent.

14. A method as claimed in claim 1, wherein, in the case that the reputation information indicates that the DNS root server can be trusted, the step of handling the DNS request or a response to that request comprises allowing the DNS request to be sent from the client computer and on receipt of the DNS request response, accessing the requested domain.

15. A method as claimed in claim 1, wherein if no reputation information can be found at the central server, the reputation information provided to the client computer causes the DNS request to be blocked from being sent, or the DNS request response is blocked from being received at the client computer.

16. A client computer comprising:
a DNS resolver for generating and sending DNS requests and receiving DNS request responses;
a DNS root authoriser for identifying the DNS root server to which DNS requests generated by the DNS resolver are addressed, sending information requests to a central server, said information requests including the identity of the DNS root server, and receiving reputation information for the identified DNS root server from said central server; and
a parental and/or content control handler for comparison of the received reputation information with the parental and/or content control settings on the client computer, and for subsequently handling the DNS requests or responses to those requests.

17. A client computer as claimed in claim 16, wherein the client computer is a personal computer, a mobile device, or any other internet-connected device.

18. A central server or server cluster, for serving a multiplicity of client computers, the central server or server cluster comprising:
a database of DNS root server reputations, each DNS root server reputation entry comprising information on the type of material typically hosted on TLDs administered by each DNS root server;
a database searcher, for finding the DNS root server reputations that correspond with DNS root servers identified in information requests being received from one or more client computers; and
a transmitter for sending reputation information back to the respective client computers, said reputation information comprising the DNS root server reputations for the DNS root servers identified in the received information requests.

19. A central server or server cluster as claimed in claim 18, wherein the server comprises a database of TLD reputations, each TLD reputation entry comprising information on known TLDs administered by a given DNS root server, and wherein the reputation information sent back to the client computers comprises a combination of DNS root server reputation and TLD reputation.

* * * * *